US007529472B2

(12) United States Patent
Lazzarini et al.

(10) Patent No.: US 7,529,472 B2
(45) Date of Patent: May 5, 2009

(54) METHOD AND APPARATUS FOR GENERATING CONSISTENT SIMULATED SMOKE

(75) Inventors: Anthony K. Lazzarini, Everett, WA (US); Steven M. Barton, Everett, WA (US)

(73) Assignee: The Boeing Company, Chicago, IL (US)

( * ) Notice: Subject to any disclaimer, the term of this patent is extended or adjusted under 35 U.S.C. 154(b) by 573 days.

(21) Appl. No.: 11/316,072

(22) Filed: Dec. 22, 2005

(65) Prior Publication Data

US 2007/0145069 A1 Jun. 28, 2007

(51) Int. Cl.
*A01G 13/06* (2006.01)
*F24H 4/00* (2006.01)

(52) U.S. Cl. ....................................... 392/387; 392/400

(58) Field of Classification Search .......... 392/386-406
See application file for complete search history.

(56) References Cited

U.S. PATENT DOCUMENTS

| | | | | |
|---|---|---|---|---|
| 3,990,987 | A | 11/1976 | Rogers | |
| 4,303,397 | A | 12/1981 | Swiatosz | |
| 4,392,810 | A * | 7/1983 | Bears et al. | 431/37 |
| 5,220,637 | A | 6/1993 | Levin, III | |
| 5,937,141 | A | 8/1999 | Swiatosz | |
| 6,280,278 | B1 | 8/2001 | Wells | |

OTHER PUBLICATIONS

Specification sheet entitled, "Corona Vicount Aviator Smoke Generator", publication date unknown, 2 pages.

* cited by examiner

*Primary Examiner*—Sang Y Paik
(74) *Attorney, Agent, or Firm*—Evan Law Group LLC

(57) ABSTRACT

A simulated smoke generator method and apparatus is provided for generating a consistent smoke plume. By using a closed loop controller to maintain at least one property, affecting one or more characteristics of the oil, at a desired level, a consistent type of simulated smoke is generated.

19 Claims, 1 Drawing Sheet

METHOD AND APPARATUS FOR GENERATING CONSISTENT SIMULATED SMOKE

BACKGROUND OF THE INVENTION

1. Field of the Invention

The invention relates generally to methods and apparatuses for generating simulated smoke, and in particular to methods and apparatuses for generating simulated smoke that may be used for testing smoke and fire detection equipment.

2. Background Description

Aircraft smoke detection testing, for example, used to test the performance of smoke detection systems for cargo compartments of aircraft, has been a highly uncertain and often costly component of the airplane certification process. Whenever a cargo compartment or a smoke detection system is designed or changed significantly, aircraft manufacturers are required to demonstrate acceptable smoke detector performance. This typically involves generating smoke in an affected compartment during a test flight, and showing that the smoke detection system produces an alarm within the specified period of time.

In connection with ongoing efforts to increase aircraft safety, the U.S. Federal Aviation Administration ("FAA") has recently elevated test requirements by demanding swifter detection of smaller smoke quantities. The present allowable smoke rate that must be detected is near the limit of many of the most current smoke detection systems, and therefore small variations in the generation rate of smoke during testing, due to factors such as ambient temperature variations, can dramatically increase the likelihood of inconsistent test results. Thus, it has become a challenge to provide not only a quantity of smoke that meets test criteria for certification of smoke detection systems, but also a repeatable and consistent quantity of smoke for tests of aircraft smoke detection equipment.

Existing smoke generator systems produce thermal aerosols for testing aircraft cargo hold smoke detection systems. Examples of such smoke generator systems include, for example, the Aviator, manufactured by Corona Integrated Technologies, Inc. and the ZZ101, manufactured by Siemens SAS. Both of these smoke generators produce mineral oil thermal aerosols. However, recent lab tests have shown that the oil temperature in the reservoirs of these generators greatly affects smoke production. Tests of the Siemens ZZ101 showed that oil cold-soaked at 35° F. produced approximately 40% of the smoke produced by oil warm-soaked at 105° F. Oil viscosity likely caused this behavior, as it changes significantly in the range of temperatures tested (the oil freezes at 14° F.). Tests of the Aviator smoke generator system produced similar results.

This variability of output with temperature adds much risk to aircraft certification efforts, as a smoke detection system that passes ground detection tests on a warm day can fail a flight test with a cooler or unheated cargo compartment. Alternately, a generator whose output registers a given smoke density during lab calibration will release less simulated smoke in the following days if those days happen to be cooler. Such sequences of events may result in costlier test efforts.

Accordingly, there is a need for smoke generation systems and methods that precisely control smoke generation rates and other relevant parameters, such as, for example smoke particle size (droplet size) and heat plume energy.

The present invention is directed to overcoming one or more of the problems or disadvantages associated with the prior art.

SUMMARY OF THE INVENTION

According to one aspect of the invention, a method of generating simulated smoke for testing of fire detection systems is provided. The method includes: providing liquid oil; using closed loop control to maintain at least one property, affecting one or more characteristics of the oil, at a substantially constant desired level; and expelling the oil in droplet form to generate a consistent type of simulated smoke. The at least one property that may be maintained at a substantially constant desired level may be oil temperature, volumetric flow rate of air, and/or chimney air temperature.

According to another aspect of the invention, a simulated smoke generator includes a liquid oil tank, a closed loop controller to maintain at least one property, affecting one or more characteristics of liquid oil in the liquid oil tank, at a desired level, and a nozzle for dispersing the oil in droplet form to generate a consistent type of simulated smoke. The closed loop controller may be adapted to maintain liquid oil temperature at a desired level, control an effective air flow area of the chimney, and/or maintain chimney air temperature at a desired level.

The features, functions, and advantages can be achieved independently in various embodiments of the present invention or may be combined in yet other embodiments.

DETAILED DESCRIPTION

Figure 1:
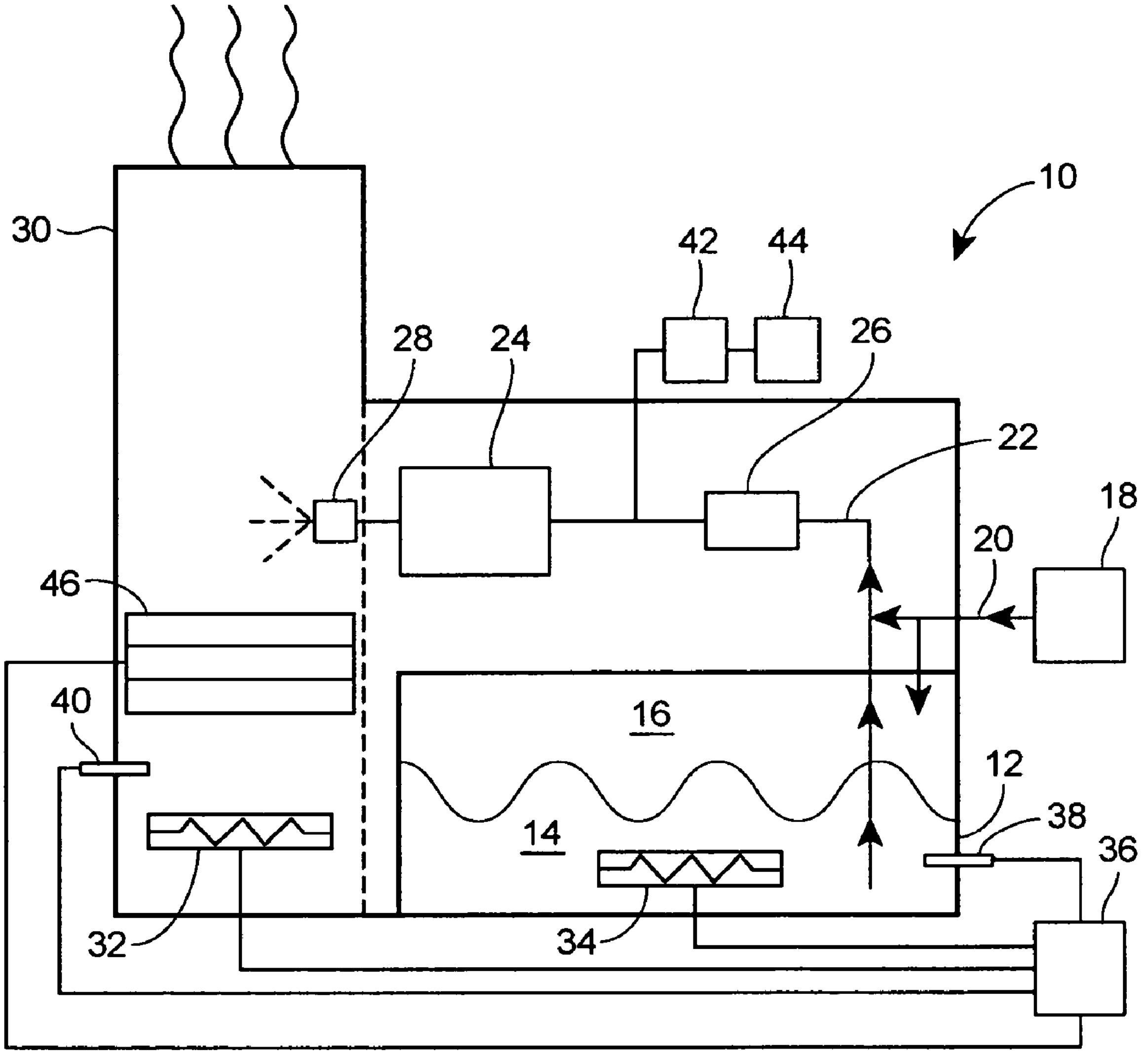
FIG. 1 is a schematic diagram illustrating an exemplary embodiment of a smoke generator system according to the invention.

As shown in FIG. 1, a smoke generator system, generally indicated at 10, includes an oil reservoir tank 12 containing oil 14 that may be placed under pressure, for example, by carbon dioxide gas 16 from a carbon dioxide ($CO_2$) tank 18. The carbon dioxide tank 18 may be connected to the oil reservoir tank 12 via a supply line 20 and the oil in turn may be forced by the pressure of the carbon dioxide 16 to flow through an oil supply passage 22 that is in fluid communication with a heater block 24 via a solenoid on/off valve 26.

Gaseous $CO_2$ pressurizes the reservoir and forces oil into the oil supply passage 22, where a small orifice (not shown) drilled into the side of the oil supply passage 22 allows $CO_2$ to enter the oil supply passage 22 and mix with the oil. The resulting $CO_2$-oil mixture travels through the on/off solenoid valve 26 to the heater block 24, where the oil is vaporized and forced through a nozzle 28 into a chimney 30. The $CO_2$-oil mixture exits the nozzle 28, cools and condenses upon discharge, and forms a thermal aerosol of microscopic (e.g., micron-sized) oil droplets. This thermal aerosol is carried upward and out of the chimney 30 by a heat plume maintained by a heater 32, that may be positioned within the chimney 30, and that heats air within the chimney 30.

The temperature of the oil 14 in the oil reservoir tank 12 may be regulated by an oil tank heater 34 that may be regulated by a controller, such as, for example, a digital proportional integral derivative (PID) controller 36, that may be operatively connected to the oil tank heater 34 and to an oil temperature sensor or thermocouple 38 for providing closed-loop control of the temperature of the oil 14 in the oil reservoir tank 12.

The temperature of the air in the chimney 30, and thus the size of the oil droplets dispersed by the nozzle 28, may also be controlled by the PID controller 36, that may be operatively connected to the heater 32 and to a chimney temperature sensor or thermocouple 40. The PID controller 36 may also be operatively connected to the heater block 24.

The oil droplet size is a function of a number of factors. Higher air temperature in the chimney 30 and/or the heater block 24 tends to produce a smaller droplet size in the thermal aerosol exiting the chimney 30, and makes the thermal aerosol more buoyant as it exits the chimney 30. A certain level of buoyancy may be desirable, since it makes the thermal aerosol behave in a manner similar to smoke from an actual fire, by rising upward. A higher flow rate of air through the chimney 30 prevents oil droplets from colliding with one another and coalescing, thereby preventing the formation of a fog of larger oil droplets (such a fog is likely to sink, rather than rise, and therefore not behave similar to smoke that typically rises). Accordingly, by flowing more air and/or hotter air through the chimney 30, a low droplet size may be maintained. Higher gas pressure applied to the liquid oil in the oil reservoir tank 12 tends to produce a larger droplet size in the thermal aerosol exiting the chimney 30.

The volumetric flow rate of air through the chimney 30 is a function of a number of variables, including air temperature in the chimney 30 and the effective flow area of the chimney 30. The average diameter of the oil droplets exiting the chimney 30 is a function of mass flow of oil exiting the nozzle 28, the temperature of the oil exiting the nozzle 28, the pressure of the oil exiting the nozzle 28, and the volumetric flow rate of air through the chimney 30. The buoyancy of the plume exiting the chimney 30 is a function of a number of variables, including the mass and temperature of the oil introduced into the chimney 30, as well as the mass and temperature of the air flowing through the chimney 30. The smoke density of the plume exiting the chimney 30 is a function of a number of variables, including the mass flow of oil exiting the nozzle 28 and the volumetric flow rate of air through the chimney 30. The mass flow of oil exiting the nozzle 28 is a function of a number of variables, including the oil temperature, oil pressure, the geometry of the nozzle 28, and the flow resistance of the fluid path (e.g., the flow resistance through the oil supply valve 22, solenoid valve 26, etc.).

Droplet size of the thermal aerosol may be affected by varying the volumetric flow rate of air through the chimney 30, for example, by varying the effective air flow area through the chimney 30. Providing a larger effective air flow area through the chimney 30 tends to spread the oil droplets apart from one another and prevents the oil droplets from coalescing. The effective air flow area through the chimney 30 may be regulated, for example, using movable louvers 46 that may be operatively connected to the controller 36. Of course, other methods and/or structures, such as one or more fans (not shown) may be used to vary the volumetric flow rate of air through the chimney 30.

A purge valve 42 may be connected to the conduit 22, downstream of the solenoid on/off valve 26, in order to purge excess oil from the system at startup using a secondary source of pressurized carbon dioxide 44.

Initial testing of a smoke generating system with an oil reservoir temperature control device according to the invention has shown that through this addition, unprecedented precision may be achieved in controlling smoke output. Together with the benefits of control over chimney air temperature, the smoke generator improvements in accordance with the invention reduce a significant portion of the risk in testing aircraft smoke detection systems. Cost savings from such improvements can be realized not only in reduced lab, ground, and flight test costs, but also in reduced risk of rushed redesigns that result from failed tests due to inconsistent smoke generation.

Other aspects and features of the present invention can be obtained from a study of the drawings, the disclosure, and the appended claims.

Although the preferred embodiments of the invention have been disclosed for illustrative purposes, those skilled in the art will appreciate that various modifications, additions, and substitutes are possible, without departing from the scope and spirit of the invention as disclosed herein and in the accompanying claims. For example, although the invention has been described primarily for use with smoke generator systems that produce thermal aerosols, the invention may of course be used with other smoke generator systems, such as, for example, wood and/or paper based smoke generators, e.g., by controlling air temperature and volume of a smoke plume to get consistent smoke characteristics, according to the invention.

What is claimed is:

1. A method of generating simulated smoke for testing of fire detection systems, the method comprising: providing liquid oil in a liquid oil tank; forcing the liquid oil in the liquid oil tank to flow from through an oil passage; mixing the liquid oil in the oil passage with a first gas; flowing the mixed liquid oil and first gas from the oil passage through a heater; vaporizing the mixed liquid oil and first gas using the heater into a vaporized mixture; forcing the vaporized mixture to be expelled into a chimney; cooling and condensing the expelled vaporized mixture in the chimney to form a thermal aersol of oil droplets; moving the thermal aersol out of the chimney using a second heated gas to generate a consistent type of simulated smoke; and using closed loop control to maintain at least one property, affecting one or more characteristics of at least one of the liquid oil, the first gas, the vaporized mixture, the thermal aersol, and the second heated gas, at a desired level.

2. The method of claim 1, wherein the at least one property that is maintained at desired level comprises a flow-rate which is maintained using a controlled air-flow rate device.

3. The method of claim 2, wherein the close loop control comprises at least one of a valve, a solenoid valve, and a controlled louver which maintain the flow-rate at the desired level.

4. The method of claim 1, wherein the closed loop control comprised at least one controlled heater which maintains a temperature at the desired level.

5. The method of claim 1, wherein the first gas comprises carbon dioxide.

6. The method of claim 1, wherein the second gas comprises air.

7. The method of claim 1, wherein the closed loop control comprises at least one of a sensor, a thermocouple, and a controller.

8. The method of claim 1, further comprising the step of purging execess liquid oil from the oil passage using a purge valve.

9. The method of claim 1, wherein the step of using closed loop control comprises using another heater to control a temperature of the second heated gas in the chimney.

10. A simulated smoke generator comprising: a liquid oil tank for supplying liquid oil; an oil passage connected to the liquid oil tank; a gas tank connected to the oil passage for pressurizing, using a first gas, the liquid oil from the liquid oil tank through the oil passage; a heater connected to the oil passage for vaporizing the liquid oil and gas into a vaporized mixture; a nozzle for expelling the vaporized mixture into a chimney; the chimney for cooling and condensing the expelled vaporized mixture to form a thermal aerosol of oil droplets and for moving the thermal aerosol out of the chimney using a second heated gas to form consistent simulated smoke; and a closed loop control to maintain at least one property, affecting one or more characteristics of the liquid oil, the first gas, the vaporized mixture, the thermal aerosol, and the second heated gas, at a desired level.

11. The simulated smoke generator of claim 10, wherein the closed loop control comprises a controlled air-flow rate device which maintains a flow-rate at the desired level.

12. The simulated smoke generator of claim 11, wherein the closed loop control comprises at least one of a valve and a controlled louver which maintains the flow-rate at the desired level.

13. The simulated smoke generator of claim 10, wherein the closed loop control comprises at least one controlled heater which maintains a temperature at the desired level.

14. The simulated smoke generator of claim 10, wherein the first gas comprises carbon dioxide.

15. The simulated smoke generator of claim 10, wherein the second gas comprises air.

16. The simulated smoke generator of claim 10, wherein the closed loop control comprises at least one of a sensor, a thermocouple, and a controller.

17. The simulated smoke generator of claim 10, further comprising at least one of a valve and a solenoid on/off valve.

18. The simulated smoke generator of claim 10, further comprising a purge valve.

19. The simulated smoke generator of claim 10, wherein the closed loop control comprises another heater for controlling a temperature of the second heated gas in the chimney.

* * * * *